SENSOR FOR DETECTION OF FREQUENCY OF A REED MODULATED MAGNETRON

Filed March 17, 1966

United States Patent Office 3,440,565

Patented Apr. 22, 1969

3,440,565
SENSOR FOR DETECTION OF FREQUENCY OF A REED MODULATED MAGNETRON

Carl H. Scullin, Breesport, N.Y., and Kenneth D. Powell, Lancaster, Pa., assignors to Westinghouse Electric Corporation, Pittsburgh, Pa., a corporation of Pennsylvania Filed Mar. 17, 1966, Ser. No. 535,201
Int. Cl. H03c 1/30, 3/32, 5/04
U.S. Cl. 332—5 6 Claims

ABSTRACT OF THE DISCLOSURE

A sensing system for a magnetron of the type in which a vibrating tuning member having a moving conductive plate is utilized to modulate the frequency of the magnetron. A stationary sensing coil is provided adjacent the conductive plate to sense the movement of the conductive plate and thereby derive a signal representative of the varying frequency of the magnetron.

This invention relates to an electron discharge device, and more particularly to a sensor for detecting the frequency of operation of the electron discharge device.

In certain electron discharge devices and particularly magnetrons, tuning means may be provided for narrow band rapid tuning. This type of tuning is particularly desirable where pulse to pulse frequency changes may be desired in a high power pulsed magnetron. Conventional, mechanical tuning systems provide up to about 500 megacycles per second frequency change while a vibratory tuning means sometimes referred to as "dither" tuning is capable of 4,000 megacycles per second change or greater. Vibratory tuning has been applied successfully in both conventional and coaxial magnetrons of the fixed and tunable types.

The vibratory tuner normally consists of a tuning element attached to a vibratory reed or member. A coil attached to the vibratory member within a magnetic field may be provided for driving the vibratory member. Alternating current is applied to the coil and as a result the vibratory member will move the tuning element within the resonant system of the magnetron. The tuning element may affect the inductance or the capacitance of the resonant system. Small changes in the magnetron resonant system result in a frequency change in the output of the magnetron.

In certain classes of radar systems, tunable pulsed magnetrons are used for the radio frequency transmitter signal source. Vibratory members are one means of tuning the magnetron. If the magnetron anode voltage is pulsed, the pulses may be of short enough duration that the frequency change due to vibration of reed is small during the individual pulse. It is possible to radiate any chosen frequency within the range of reed movement. In these systems, it is necessary to generate information at the trasmitter which can be used to set the local oscillator of the receiver so that it is tuned to the correct frequency corresponding to that frequency which was transmitted.

It is accordingly an object of this invention to provide an improved electron discharge device.

It is another object to provide an improved tunable magnetron in which a sensing element is provided for sensing the tuner position.

It is another object to provide a sensing system for a magnetron for determining the position of the tuning element and developing a control signal.

It is another object of this invention to provide an improved system in which information generated at the transmitter may be used to set the local oscillator of a receiver so that the receiver is tuned to the proper frequency to receive the signal transmitted by the transmitter.

It is another object of the invetnion to provide a signal output from a magnetron that is directly related to the position of the vibrating tuner and thus to the output frequency of the magnetron.

In brief, the present invention provides a sensing system in the form of a stationary coil mounted in close proximity to a moving conductive plate which is attached to the vibrating tuning member of a magnetron to thereby modulate the inductance of the fixed coil in accordance with the position of the tuning member to provide a signal representative of the frequency of the magnetron.

These and other objects and advantages of the present invention will become more apparent when considered in view of the following detailed description and drawing, in which.

Figures 1, 3:
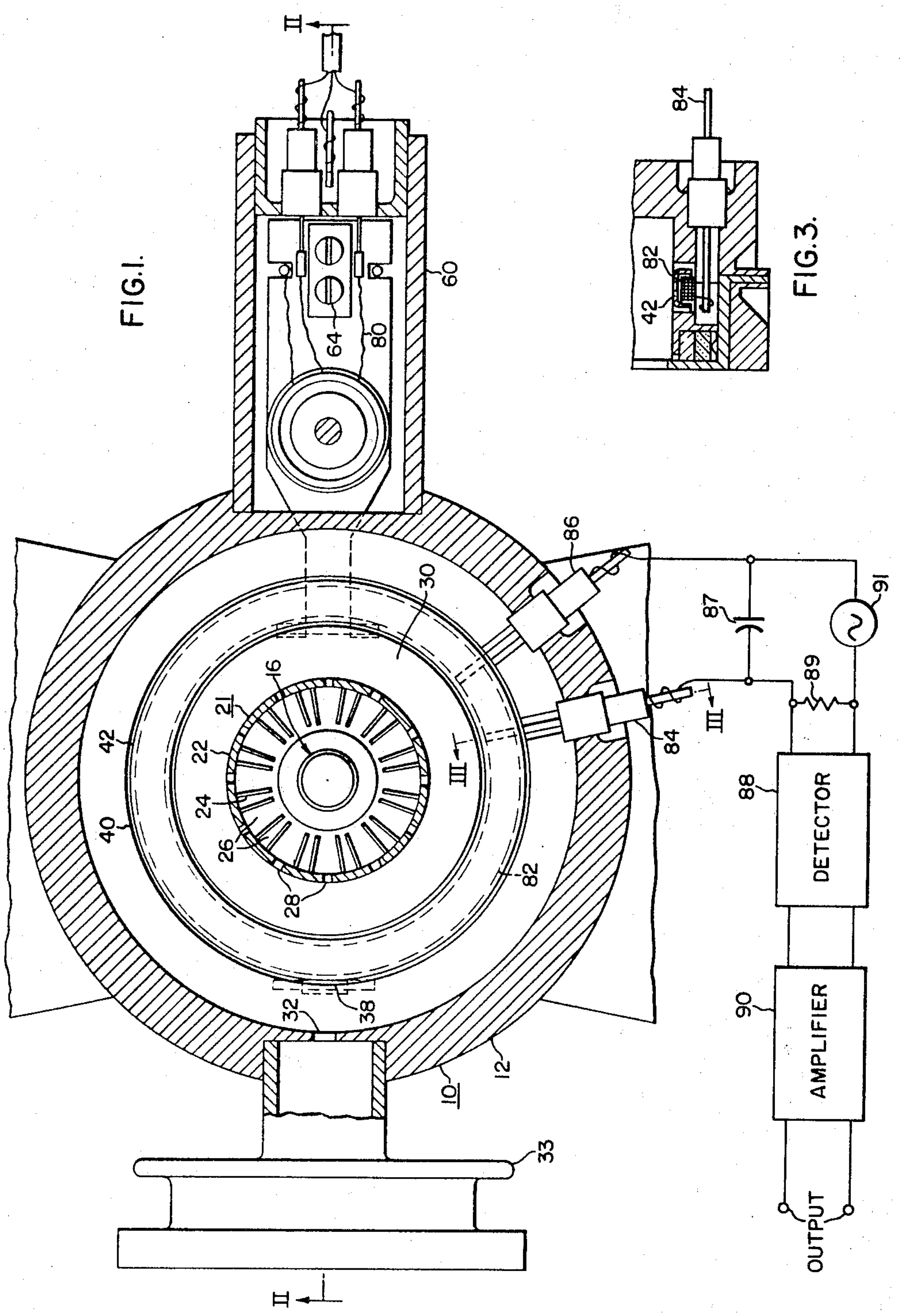
FIGURE 1 is a plan view, partly in section, of a coaxial magnetron with associated sensing circuitry, embodying the present invention, the view being taken along the line I—I of FIG. 2.
FIG. 3 is a sectional view taken along the line III—III of FIG. 1.

With reference to the drawings, there is shown a coaxial magnetron embodying the present invention. The magnetron is comprised of a body member 10 which is substantially cup-shaped and includes a cylindrical side wall 12 and a bottom plate 14. The body member 10 is of a suitable electrically conductive material such as copper. A cathode 16 is centrally disposed within the body 10. The cathode 16 includes a sleeve member 18 of a suitable material such as molybdenum having an electron emissive coating 20 provided thereon of a suitable material such as barium oxide.

Surrounding the cathode 16 is an anode 21 which has a cylindrical wall 22 having a plurality of vane members 24 which extend radially inward therefrom. The planes of the anode vanes 24 are inclusive of the axis of the cylindrical anode wall 22 and define in cooperation with the anode wall 22 an array of anode cavity resonators 26. Coupling slots 28 extend through the cylindrical anode wall 22 and communicate with alternate cavity resonators 26.

The cylindrical wall portion 12 of the body 10, the cylindrical anode wall 22 and the bottom plate or end cover 14 of the body 10 define, in part, an outer cavity resonator 30. Extending through the wall 12, so as to communicate with the outer cavity resonator 30, is an output coupling slot 32.

The coupling slot 32 serves as a means for coupling energy from the outer cavity resonator 30 to an output. An output window assembly 33 is associated with the output coupling slot 32 to provide suitable matching and a vacuum type barrier in a well known manner.

A disk shaped upper plate 34 is positioned on top of the cup-shaped body member 10. The plate or end cover 34 is of a suitable non-magnetic material such as stainless steel and is vacuum sealed at its periphery to the cylindrical wall portion 12. This vacuum seal may be made by a suitable brazing or welding operation. An upper pole piece 36 of a suitable magnetic material projects through the upper plate 34 as illustrated in the drawings and is vacuum sealed to the aperture in the upper plate 34. A lower pole piece 37 extends through an aperture provided in the lower end plate 14 and is sealed therein. Both pole pieces 36 and 37 are annular in cross-section and surround a portion of the cathode sleeve 18. The external portion of the magnetic circuit includes two C-shaped magnets 39 that are secured to the pole pieces 36 and 37. The magnetron assembly may be evacuated through a suitable port and closed off by well known means.

An annular groove 40 is provided in the upper surface of the bottom plate 14. The upper surface of the plate 14 forms one wall of the cavity resonator 30. A tuning ring 42 is positioned within the groove 40 and is secured at one point 38 by a flexible connection 44. The connection 44 may be substantially at the same angular position as the output coupling slot 32 with respect to the cavity resonator 30. The tuning ring 42 is also connected to a flexible tab 50 diametrically opposite with respect to the tab 44. The tab connection 44 is secured to the bottom plate 14 while the tab 50 is secured to a flexible elongated member 52. This elongated member or reed 52 may be of a suitable non-magnetic material such as stainless steel or copper. The member 52 has a thickness of about .025 inch and a width of about .150 inch at the free end. The tuning ring 42 is of a good electrically conductive material such as copper. The ring 42 has a thickness of about .005 inch and a width of about .150 inch. The depth of the groove 40 is about .090 inch and the width of the groove is about .155 inch. In the specific embodiment shown, the tuning ring 42 is disposed at substantially equal distances from the outer wall 12 and the anode wall 22.

The elongated member 52 is provided with a suitable driving mechanism. This driving mechanism is provided within an outer casing 60 of a suitable material such as copper, which is secured to the outer wall 12. The casing 60 is vacuum sealed to the body member 10. The elongated vibratory member 52 is disposed within the casing 60 and extends through an opening 66 in the wall 12 and plate 14. One end of the elongated member 52 is secured to the tuning ring 42 and the opposite end of the elongated member 52 is secured to a support portion 62 by means of suitable fastening means such as a screw 64. The elongated member 52 extends through the opening 66 in the side wall 12 and the bottom plate 14 to engage the tab member 50. The opening 66 is adequate to permit movement of the elongated member 52 in a vertical direction and vibrate about the fixed end. Also provided within the casing 60 is a pole piece 68 which extends through an aperture 70 in the elongated member 52. A second pole piece 72, which is substantially cup-shaped, is supported from the pole piece 68 by means of spacer 74 which is of a non-magnetic material. The two pole pieces 72 and 68 are dimensioned and positioned such that a portion of the pole piece 68 extends into the cup of the pole piece 72.

Secured to the upper side of the elongated member 52 and positioned about the aperture 70 is a sleeve member 76 of a suitable material such as a non-magnetic stainless steel. Around the sleeve 76 and insulated from it there is formed a coil 78 of electrically conductive wire. The sleeve 76 and the coil 78 are of such length to extend from the elongated member 52 into the cup-shaped pole piece 72. Suitable conductors 80 extend from the coil 78 through the casing 60. The conductors 80 are insulated from the casing and are provided with a suitable electrical potential. The two pole pieces 68 and 72 are located within the fringe field of the main magnets 39 which are connected to the pole pieces 36 and 37. This fringing field provides a magnetic field between the pole pieces 68 and 72 which extends radially between the pole pieces 68 and 72.

Figure 2:
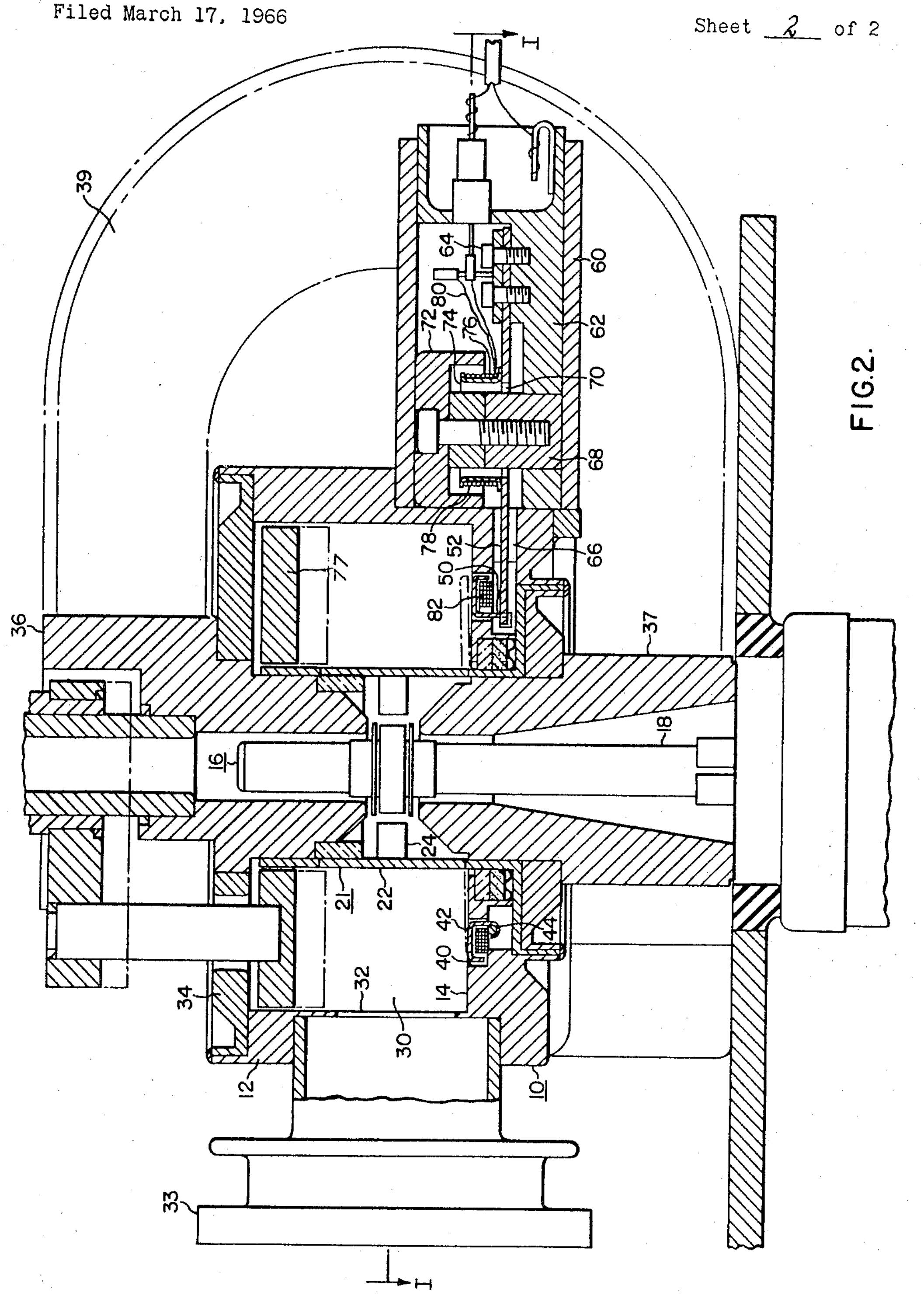
FIG. 2 is a side elevational view, partly in section, taken along the line II—II of FIG. 1.

In operation, the passage of current through the coil 78 which is located within the radial magnetic field will cause movement of the elongated member 52 and in turn movement of the ring 42 tending to tilt the ring 42 as indicated by the dotted lines in FIG. 2. In this manner frequency tuning is achieved when the drive system moves the ring 42 substantially parallel to the axis of the cavity 30 and changes in effect the volume of the cavity 30. In one specific device, in which the operating frequency of the magnetron was 16,500 megacycles, raising the tuning ring 42 at the point of driving by an amount of .005 inch resulted in a change in frequency to 16,515 megacycles.

By driving the ring 42 below the surface of the wall 14 by a distance of .005 inch resulted in a change of frequency to about 16,485 megacycles.

In the specific device illustrated, the coaxial magnetron is of the tunable type in which a mechanically movable tuning member 77 is provided in the upper portion of the cavity. This type of tuning is more fully described in copending application No. 298,775 filed July 30, 1963 now U.S. Patent 3,263,118 and assigned to the same assignee as this invention.

It is also obvious that different means of driving the tuning ring 42 could be provided. For example, it might be desirable to have more than one driving unit so that different electrical signals could be utilized for each of the driving units. It is also obvious that other tuning configurations for the ring 42 might be incorporated in the cavity.

A circular sensing coil 82 is positioned within the groove 40 adjacent the tuning ring 42. The elongated member 52 extends below the coil 82. The coil 82 is in close proximity to the tuning ring 42 and is fixed in position. The coil 82 consists of 36 turns of electrically conductive material such as #35 copper wire. The movement of the highly conductive ring 42 modulates the inductance of the coil 82. Movement of the tuning ring 42 by the vibrating reed system to produce frequency shift in the magnetron produces a change in the inductance of the coil 82 in accordance with the magnetron frequency.

In order to obtain a signal output which is simply related to the inductance variation of the fixed coil 82, the coil 82 is electrically resonated with an external shunt capacitor 87. The coil 82 is provided with external terminals 84 and 86. The capacitor 87 is connected across the terminals 84 and 86. The tank circuit consisting of coil 82 and capacitor 87 is connected in series with a resistor 89 and an audio (or supersonic) frequency oscillator 91. The oscillator 91 is adjusted to a frequency slightly higher or lower than the unmodulated resonant frequency of the tank circuit and preferably about halfway down the side of the resonance curve. Thus, small changes in the inductance of the fixed coil 82 result in relatively large changes in the impedance of the slightly off resonance tank circuit. If the value of the series resistor 89, is properly chosen, about 1000 ohms, the voltage drop across the resistor 89 when the signal is demodulated provides an output signal whose amplitude is a sensitive function of the position of the moving tuning ring member 42, which is modulating the coil inductance. Since the tuning ring 42 is mechanically coupled to the vibrating reed system which frequency tunes the magnetron radio frequency output, the demodulated voltage drop across the resistor 89 is directly related to the frequency of the magnetron radio frequency output. The inductance of the coil 82 may be about 22 microhenries and the capacitor 87 may be about .01 microfarads. The frequency of the oscillator 91 may be 345 kilocycles per second and a representative reed frequency is 217 cycles per second.

A detector 88 and an amplifier 90 are provided for detecting and amplifying the signal to provide the necessary information signal to control the frequency of the local oscillator of the receiver. Any suitable detector may be utilized such as those described in the Radio Engineers Handbook, First Edition by F. E. Terman pages 533 to 562. A suitable amplifier is described on pages 353 to 376 of the same reference. A suitable oscillator is described on pages 480 to 530 of the same reference.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

We claim as our invention:

1. A magnetron comprising a cathode, a cylindrical anode surrounding said cathode, resonant circuit means operatively associated with said anode, a tuning assembly for said magnetron comprising an assembly including an elongated flexible member fixed at one end and free at the other end and means for flexing said flexible member, a tuning member secured to the free end of said flexible member for modifying said resonant circuit means of said magnetron in response to movement and thereby changing the frequency of said magnetron, a fixed sensor coil means positioned in close proximity to said tuning member and exhibiting the property of change in inductance in response to movement of said tuning member.

2. The magnetron of claim 1 in which said sensor coil is connected across a capacitor to form a tank circuit.

3. The magnetron of claim 1 in which said fixed sensor coil is connected across a capacitor and the tank circuit thus formed is connected in series with an oscillator and a resistor, said oscillator operating at a frequency off resonance with respect to the resonant frequency of said tank circuit.

4. The magnetron of claim 1 in which said cylindrical anode includes a plurality of anode resonators circularly positioned about said cathode, an outer cylindrical wall surrounding said cylindrical anode, said cylindrical wall and said anode with end walls defining an outer cavity resonator of substantial annular cross-section and in which said tuning member is provided within a wall of said cavity resonator and in which said fixed sensor coil is positioned in close proximity to said tuning member.

5. The magnetron of claim 4 in which said tuning member is an electrically conductive ring.

6. The magnetron of claim 5 in which said tuning member is positioned within a groove in one of said end walls.

References Cited

UNITED STATES PATENTS

| | | | |
|---|---|---|---|
| 2,599,237 | 6/1952 | Cuccia | 332—5 |
| 2,750,565 | 6/1956 | Mercer et al. | 332—5 |
| 2,915,675 | 12/1959 | Vaccaro | 331—90 X |
| 2,940,007 | 6/1960 | Thal | 315—39.55 |
| 3,087,124 | 4/1963 | McLeod | 332—5 X |

ALFRED L. BRODY, *Primary Examiner.*

U.S. Cl. X.R.

315—39.55; 331—5, 90; 332—16, 51